Patented Nov. 2, 1937

2,098,199

UNITED STATES PATENT OFFICE 2,098,199

FERMENTATION OF AMYLACEOUS MATERIALS

Hugh R. Stiles, Terre Haute, Ind., assignor to Commercial Solvents Corporation, Terre Haute, Ind., a corporation of Maryland No Drawing. Application March 2, 1934, Serial No. 713,692

14 Claims. (Cl. 195—44)

My invention relates to the production of butyl alcohol and other valuable products by the fermentation of starchy carbohydrate mashes. More specifically, my invention relates to the production of normal butyl alcohol, acetone, and ethyl alcohol by the fermentation of starchy mashes, and especially cereal mashes, by means of bacteria designated herein as *Clostridium saccharo-acetobutylicum*.

It has previously been known that starch mashes could be fermented by means of organisms of the *Clostridium butyricum* group with the production of various products such as acetic and butyric acids, butyl alcohol, etc. (see for example, Bergey's Manual of Determinative Bacteriology, Williams & Wilkins Co., Baltimore, 1925, pages 326–7). However, the yields of butyl alcohol have in practically all cases been so low as to preclude commercial utilization of such fermentations. This is particularly true in the case of cereal mashes such as corn mash. Up to the present time, therefore, the commercial production of butyl alcohol by fermentation has been accomplished only by means of organisms of the type *Clostridium acetobutylicum* (Weizmann).

I have now discovered that the group of bacteria designated herein as *Clostridium saccharo-acetobutylicum* will produce satisfactory yields of butyl alcohol from starchy mashes such as corn mash, if there are maintained certain fermentation conditions, especially the provision of a suitable source of nitrogen, and a control of the hydrogen ion concentration by means of substances such as calcium carbonate. So much confusion exists in the nomenclature and reported cultural characteristics of the prior art organisms of the *Clostridium butyricum* type that it is impossible to state definitely if any of them are included in the group now designated as *Clostridium saccharo-acetobutylicum*. A certain organism, for example, may be described by one investigator as having properties which would bring it within the present classification, whereas another investigator may report an organism of the same name to have properties which would definitely exclude it from this classification. It is to be understood, therefore, that my invention includes within its scope the use of any of the prior art bacteria which have in fact the characteristics hereinafter specified, irrespective of any conflicting characteristics which may have been reported in the literature. It is to be further understood, of course, that my invention relates to the use of these organisms only under the newly devised fermentation conditions to be hereinafter specified, and not to the use of these organisms generally, under any conditions.

The bacteria designated herein as *Clostridium saccharo-acetobutylicum* are described at length in copending application Serial No. 675,459 by J. C. Woodruff et al., filed June 12, 1933. For the purposes of the present invention, these bacteria may be briefly defined by the following characteristics:

I. Morphological
   A. Rod-shaped
   B. Spores—terminal
   C. Practically indistinguishable from members of the *Clostridium butyricum* group.

II. Biochemical
   A. Carbohydrate fermentation
      1. Inability to produce yields of butyl alcohol and acetone consistently greater than 10%, on the weight of the starch, from mashes consisting solely of cereal meal and water
      2. Ability to produce yields of butyl alcohol and acetone consistently above 25%, on the weight of the starch, from cereal mashes containing ammonia nitrogen and a suitable neutralizing agent
   B. Nitrogen metabolism
      1. Ability to produce satisfactory yields of butyl alcohol and acetone in starch mashes containing ammonia as the principal source of nitrogen
      2. Inability to produce satisfactory yields of butyl alcohol and acetone in starch mashes containing undegraded protein as the sole source of nitrogen
      3. Inability to liquefy gelatin or to produce more than slight proteolysis of milk
   C. Oxygen requirements
      1. Anaerobic—but will ferment satisfactorily under aerobic conditions due to anaerobic conditions existing within the main body of the fermenting mash
   D. Temperature range for solvent production
      1. From 24° C. to 40° C., preferably 29° C. to 30° C.
   E. Hydrogen ion concentration for solvent production in starch mashes
      1. Final pH of 4.5–8.5, preferably 5.0–6.2.

The characteristics outlined above may be determined by the usual tests known to those skilled in the art. Suitable methods for this purpose are outlined in copending application Serial No.

675,459, referred to above. With the exceptions noted in the outline, the characteristics were determined in mashes of commercial concentrations and under optimum fermentation conditions. It will, of course, be recognized by those skilled in the art that the characteristics of this outline refer to normal consistent results and not to abnormally high or low results which may sometimes be obtained with any culture.

Although the present invention includes within its scope all bacteria which have in common the characteristics outlined above, irrespective of any differences in minor characteristics not included in this outline, it is preferred to use a particular member of this group of organisms which has been designated *Clostridium saccharo-acetobutylicum-alpha*. This organism is described below according to the Descriptive Chart of the Society of American Bacteriologists.

Name of organism: *Clostridium saccharo-acetobutylicum-alpha*
Source: Soil
I. Morphology
  1. Vegetative cells
    Form: Short and long rods
    Arrangement: Single and chains
    Limits of length: 2.5–7.0 microns; of diameter 1.0–1.3 microns
    Size of majority: 4.0 x 1.0 microns
    Ends: Rounded
  2. Sporangia: Present
    Form: Spindled, clavate
    Limits of length: 2.5–11.0 microns; of diameter 1.6–2.3 microns
    Size of majority: 6.0 x 2.2 microns
  3. Endospores: Present
    Medium used: 20% potato mash; 14 days at 30° C.
    Stain used: Nigrosin
    Location of endospores: Central to terminal
    Form: Ellipsoidal to cylindrical
    Limits of length: 3.0–5.0 microns; of diameter 1.8–2.2 microns
    Size of majority: 4.0 x 2.0 microns
  4. Motility
    In broth: ++
    On agar: ++
  5. Flagella: Present
    Attachment: Peritrichiate
    Strain used: Cesares Gil
  6. Irregular forms: Many
  7. Staining reactions
    Gram stain:
      1 day: Positive
      2 days: Positive, some negative
      3 days: Negative, some positive
      4 days: Negative
  8. Iodine stain: Granulose shown in *Clostridia* at 48 hours
II. Cultural characteristics
  1. Agar stroke
    Medium used: 2% glucose agar containing 0.1% $(NH_4)_2SO_4$
    Incubation temperature: 30° C.
    Age: 3 days
    Growth: Moderate (incubated anaerobically)
    Form: Beaded
    Elevation: Raised to convex
    Luster: Glistening
    Surface: Smooth to contoured
    Optical character: Opaque II. Cultural characteristics—Continued
  1. Agar stroke—Continued
    Chromogenesis: None to light cream or light yellow
    Odor: Butyrous or butylic
    Consistency: Viscid
    Medium: Unchanged
  2. Nutrient broth + 1% glucose
    Incubation temperature: 30° C.
    Age: 2 days
    Surface growth: None
    Clouding: Yes
    Odor: Slightly butyrous
    Sediment: Very slight in 2 days, decided in 7 days
  3. Gelatin stab
    Medium used: 2% glucose gelatin
    Incubation temperature: 22° C.
    Age: 30 days
    Growth: Slight, better at bottom
    Line of puncture: Beaded
    Liquefaction: None
    Degree of liquefaction in 30 days: None
    Medium: Unchanged
  4. Agar colonies
    Medium used: 2% glucose agar containing 0.1% $(NH_4)_2SO_4$
    Incubation temperature: 30° C.
    Age: 3 days
    Growth: Slow
    Form: Circular
    Surface: Smooth
    Elevation: Raised to convex
    Edge: Entire
    Internal structure: Finely-granular
III. Physiology
  1. Temperature relations
    Fermentation temperature range: 24–40° C.
  2. Relation to reaction of medium
    Fermentation pH range: 4.0–7.0
  3. Chromogenesis
    Nutrient gelatin: None to slight cream
    Nutrient agar: None to slight cream
    Potato: Cream
  4. Production of indole
    Medium: Broth in 1% glucose
    Test used: Paradimethylaminobenzaldehyde
    Presence: Absent
  5. Production of hydrogen sulfide
    Medium: Glucose lead acetate agar
    Presence: Absent
  6. Relation to oxygen
    Medium: 2% glucose agar containing 0.1% ammonium sulphate
    Aerobic growth: None
    Anaerobic growth: Moderate
    Medium: Deep tubes of corn mash medium containing ammonium sulphate and calcium carbonate
    Aerobic growth: Abundant
    Anaerobic growth: Abundant
  7. Litmus milk
    Reaction: Acid in 1–2 days
    Acid curd: Slowly formed, 7–14 days
    Peptonization: Slight in 30 days
    Reduction of litmus:
      Beginning: 1–2 days
      End: Uncertain due to oxidation of litmus by atmosphere above medium
  8. Nitrate reduction
    Medium: Nitrate-peptone broth III. Physiology—Continued
  Nitrite: Alpha-naphthylamine-sulphanilic acid
  Gas: Absent
9. Carbohydrate fermentation
  Medium used: 1.0% carbohydrate
              0.5% peptone
              0.05% $KH_2PO_4$
              0.05% $K_2HPO_4$
              0.3% $(NH_4)_2SO_4$
              0.02% $MgSO_4$
              .001% NaCl
              .001% $MnSO_4$
              .001% $FeSO_4$
              pH adjusted to 6.3
  Incubation temperature: 30° C.
  Time: 72 hours

| Carbohydrate | Acid* | Gas* |
|---|---|---|
| Corn starch | +++ | +++ |
| Soluble starch | +++ | +++ |
| Dextrin | +++ | +++ |
| Raffinose | + | + |
| Sucrose | +++ | ++++ |
| Lactose | ++ | ++ |
| Maltose | +++ | ++++ |
| Glucose | +++ | ++++ |
| Levulose | +++ | ++++ |
| Xylose | +++ | ++ |
| Mannitol | | |
| Glycerol | + | + |
| Dulcitol | − | − |

*—negative; +very slight; ++moderate; +++ decided; ++++ abundant

It is known to those skilled in the art that many of the characteristics included in the above descriptive chart are variable and that different results may be obtained by only slight changes in the media, age of culture, or fermentation conditions. That chart, therefore, is included herein as an aid in identification of the bacteria and not as an absolute limitation. It is believed that with the aid of the general outline previously given and the above descriptive chart, one skilled in the art can readily identify *Clostridium saccharo-acetobutylicum-alpha* with certainty in spite of slight variations in the minor characteristics of the chart. In any event, a check can be obtained by testing the culture at different intervals and under slightly different fermentation conditions noting the characteristics which appear most consistently.

The organisms of this group are widely distributed in nature and may be isolated from such various sources as soil, rotted wood, grain, corn stalks, river mud, and the like. In view of the characteristics listed above, one skilled in the art may readily isolate these organisms from such sources by known methods of isolation. Of course, as is apparent to one skilled in the art, these organisms cannot be isolated from every sample of material tested. However, if a number of different materials are tried, a good culture will nearly always be secured. A suitable method of isolation, for the purposes of the present invention, comprises enrichment in cereal mashes containing ammonia nitrogen and an insoluble neutralizing agent, followed by anaerobic plating if further purification is desired. The procedure outlined in the copending application, hereinbefore referred to, will also be found to be satisfactory for isolating organisms of this group.

In carrying out my invention the fermentation media may comprise mashes of any of the commercial starchy carbohydrates such as corn, rye, or other cereals, potatoes, cassava, and the like. In general, however, I prefer to utilize corn mash. The concentration of the mash will vary, depending upon the particular source of carbohydrate employed, but, in general, should range between 3 and 6% by weight, calculated on the starch content of the carbohydrate. For example, a mash containing 7% corn (dry weight) will be found to be quite satisfactory.

The nitrogen source constitutes an essential element of my invention and is primarily responsible for the improved yields secured. The principal source of nitrogen should comprise ammonia, preferably in the form of a salt such as ammonium sulphate or ammonium phosphate. In addition to the ammonia, it is desirable to include other forms of nitrogen, preferably of the degraded types such as yeast water, steep water, distillery slops, and the like. A certain amount of whole protein may also be found to be desirable, but this is usually present in commercial sources of starchy carbohydrate such as cereal meal or the like. The concentration of ammonia nitrogen in the mash will depend somewhat upon the amount of degraded nitrogenous material present. In general, however, a concentration of 0.15% to 0.35% of an ammonium salt will be found to be satisfactory. The following experiment will illustrate the improved results secured by utilizing ammonia as the principal source of nitrogen in this fermentation. In this experiment a mash was prepared containing 7.8% of corn (dry weight), 0.4% of calcium carbonate, and 0.2% of nitrogenous nutrient. The mash was sterilized in the usual manner, inoculated with an active culture of *Clostridium saccharo-acetobutylicum-alpha* and incubated at 30° C. for 72 hours. The yields secured for these fermentations, with and without ammonia or corn germ meal, are reported in the table below:

| Fermentation No. | Corn germ meal % by wt. | Ammonium sulphate % by wt. | Yield wt. % of starch |
|---|---|---|---|
| 1 | 0.0 | 0.0 | 4.3 |
| 2 | 0.2 | 0.0 | 4.9 |
| 3 | 0.0 | 0.2 | 30.8 |

It is also essential for obtaining optimum yields in this fermentation that the hydrogen ion concentration of the mash be controlled during fermentation in a manner such that the acidity of the mash will drop after the peak of the fermentation has been reached, and solvents rather than acids will be produced as the end products. This control of the hydrogen ion concentration may most easily be effected by the presence of a small amount of a nontoxic insoluble basic neutralizing agent in the mash. Such materials as calcium carbonate, barium carbonate, iron carbonate and the like are suitable for this purpose. Calcium carbonate is to be preferred from an ecomonic standpoint and a concentration from 0.2% to 0.6%, on the weight of the total mash in excess of that required to neutralize initial acidity, will generally be found to be quite satisfactory. Other methods of securing the hydrogen ion control, such as titration with soluble basic materials, may also be employed, but such methods are more delicate and require great skill or expensive apparatus for their satisfactory use. Continuous or semi-continuous electrometric titration is probably the most suitable of these procedures. In any such case, the control should be effected in a manner simulating the action of the insoluble neutralizing agent in the mash.

The following specific examples will serve to illustrate the process of the present invention:

Example I

A corn mash containing 4.5% of corn, (dry weight), 0.4% of calcium carbonate, and 0.2% of ammonium sulphate was prepared and inoculated with 4% by volume of an active culture of Clostridium saccharo-acetobutylicum-alpha and incubated at 30° C. for 72 hours. The yield and solvent ratio were found to be as follows:

| Yield % of starch | Solvent ratio | | |
|---|---|---|---|
| | Butyl alcohol | Acetone | Ethyl alcohol |
| 32.6 | 73.1 | 23.0 | 3.9 |

Example II

A corn mash containing 7.0% of corn (dry weight), 0.3% ammonium sulphate, and 0.4% of calcium carbonate was prepared and sterilized in the usual manner. The mash was inoculated with 4% by volume of an active culture of the type Clostridium saccharo-acetobutylicum which had been isolated from soil. The yield and solvent ratio obtained after incubation at 30° C. for 72 hours were found to be as follows:

| Yield % of starch | Solvent ratio | | |
|---|---|---|---|
| | Butyl alcohol | Acetone | Ethyl alcohol |
| 31.0 | 71.8 | 25.6 | 2.6 |

It is to be understood, of course, that my invention is not to be limited to the specific examples or the specific materials or methods given above. Starchy carbohydrates other than those specifically mentioned may be employed in my process and one skilled in the art can readily make such adjustments in the composition of the media as are necessary to approximate the examples given. Likewise, other sources of nitrogen may be employed, such as amino acids, urea and the like, and as the amount of such lower forms of nitrogen is increased, the amount of ammonia may be correspondingly decreased. One skilled in the art may readily determine, by preliminary fermentations, the optimum concentrations of the various nitrogenous materials employed. In general it may be said that equivalents and modifications of the procedure which would naturally occur to one skilled in the art may be employed without departing from the scope of my invention.

My invention now having been described, what I claim is:

1. In a process for the production of normal butyl alcohol, acetone, and ethyl alcohol by the fermentation of an essentially starchy mash by means of bacteria of the group Clostridium saccharo-acetobutylicum while maintaining the acidity of the mash within the optimum range for fermentation, the improvement which comprises effecting the fermentation in the presence of ammonia nitrogen as the principal source of nitrogen for the bacteria.

2. In a process for the production of normal butyl alcohol, acetone, and ethyl alcohol by the fermentation of an essentially starchy mash by means of bacteria of the group Clostridium saccharo-acetobutylicum while maintaining the acidity of the mash within the optimum range for fermentation, the improvement which comprises effecting the fermentation in the presence of from 0.15% to 0.35% of an ammonium salt, calculated on the total weight of the mash.

3. In a process for the production of normal butyl alcohol, acetone, and ethyl alcohol by the fermentation of an essentially starchy carbohydrate mash by means of bacteria of the group Clostridium saccharo-acetobutylicum, the improvement which comprises effecting the fermentation in the presence of from 0.15% to 0.35% of an ammonium salt, calculated on the total weight of the mash, and from 0.2% to 0.6% of a nontoxic insoluble basic neutralizing agent in excess of that required to neutralize any initial acidity of the mash.

4. In a process for the production of normal butyl alcohol, acetone, and ethyl alcohol by the fermentation of corn mash by means of bacteria of the group Clostridium saccharo-acetobutylicum, the improvement which comprises effecting the fermentation in the presence of from 0.15% to 0.35% of ammonium sulphate, calculated on the total weight of the mash, and from 0.2% to 0.6% of calcium carbonate in excess of that required to neutralize any initial acidity of the mash.

5. A process for the production of normal butyl alcohol, acetone, and ethyl alcohol which comprises subjecting a mash containing starchy carbohydrate as the principal fermentable carbohydrate and ammonia nitrogen as the principal source of nitrogen to the action of bacteria of the group Clostridium saccharo-acetobutylicum, at temperatures from 24° C. to 40° C., while controlling the acidity of the mash during the fermentation whereby the final hydrogen ion concentration secured by the action of the bacteria falls within the range pH 5.0 to pH 6.5.

6. A process for the production of normal butyl alcohol, acetone, and ethyl alcohol which comprises subjecting a mash containing starchy carbohydrate as the principal fermentable carbohydrate and ammonia nitrogen as the principal source of nitrogen to the action of bacteria of the group Clostridium saccharo-acetobutylcium, at temperatures from 24° C. to 40° C., while controlling the acidity of the mash during the fermentation by means of a nontoxic insoluble basic neutralizing agent whereby the final hydrogen ion concentration secured by the action of the bacteria falls within the range pH 5.0 to pH 6.5.

7. A process for the production of normal butyl alcohol, acetone, and ethyl alcohol which comprises subjecting the mash containing starchy carbohydrate as the principal fermentable carbohydrate and an ammonium salt as the principal source of nitrogen to the action of bacteria of the group Clostridium saccharo-acetobutylicum, at temperatures from 24° C. to 40° C., while controlling the acidity of the mash during the fermentation by means of calcium carbonate whereby the final hydrogen ion concentration secured by the action of the bacteria falls within the range pH 5.0 to pH 6.5.

8. A process for the production of normal butyl alcohol, acetone, and ethyl alcohol which comprises subjecting corn mash containing from 0.15% to 0.35% of ammonium sulphate to the action of bacteria of the group Clostridium saccharo-acetobutylicum, at temperatures from 24° C. to 40° C., while controlling the acidity of the mash during the fermentation by means of calcium carbonate whereby the final hydrogen ion concentration secured by the action of the bacteria falls within the range pH 5.0 to pH 6.5.

9. In a process for the production of normal butyl alcohol, acetone, and ethyl alcohol by the fermentation of an essentially starchy carbohydrate mash by means of *Clostridium saccharo-acetobutylicum-alpha*, the improvement which comprises effecting the fermentation in the presence of from 0.15% to 0.35% of an ammonium salt, calculated on the total weight of the mash, and from 0.2% to 0.6% of a nontoxic insoluble basic neutralizing agent in excess of that required to neutralize any initial acidity of the mash.

10. In a process for the production of normal butyl alcohol, acetone, and ethyl alcohol by the fermentation of corn mash by means of *Clostridium saccharo-acetobutylicum-alpha*, the improvement which comprises effecting the fermentation in the presence of from 0.15% to 0.35% of ammonium sulphate, calculated on the total weight of the mash, and from 0.2% to 0.6% of calcium carbonate in excess of that required to neutralize any initial acidity of the mash.

11. A process for the production of normal butyl alcohol, acetone, and ethyl alcohol which comprises subjecting a mash containing starchy carbohydrate as the principal fermentable carbohydrate and ammonia nitrogen as the principal source of nitrogen to the action of *Clostridium saccharo-acetobutylicum-alpha*, at temperatures from 24° C. to 40° C., while controlling the acidity of the mash during the fermentation whereby the final hydrogen ion concentration secured by the action of the bacteria falls within the range pH 5.0 to pH 6.5.

12. A process for the production of normal butyl alcohol, acetone, and ethyl alcohol which comprises subjecting a mash containing starchy carbohydrate as the principal fermentable carbohydrate and ammonia nitrogen as the principal source of nitrogen to the action of *Clostridium saccharo-acetobutylicum-alpha*, at temperatures from 24° C. to 40° C., while controlling the acidity of the mash during the fermentation by means of a nontoxic insoluble basic neutralizing agent whereby the final hydrogen ion concentration secured by the action of the bacteria falls within the range pH 5.0 to pH 6.5.

13. A process for the production of normal butyl alcohol, acetone, and ethyl alcohol which comprises subjecting the mash containing starchy carbohydrate as the principal fermentable carbohydrate and an ammonium salt as the principal source of nitrogen to the action of *Clostridium saccharo-acetobutylicum-alpha*, at temperatures from 24° C. to 40° C., while controlling the acidity of the mash during the fermentation by means of calcium carbonate whereby the final hydrogen ion concentration secured by the action of the bacteria falls within the range pH 5.0 to pH 6.5.

14. A process for the production of normal butyl alcohol, acetone, and ethyl alcohol which comprises subjecting corn mash containing from 0.15% to 0.35% of ammonium sulphate to the action of *Clostridium saccharo-acetobutylicum-alpha*, at temperatures from 24° C. to 40° C., while controlling the acidity of the mash during the fermentation by means of calcium carbonate whereby the final hydrogen ion concentration secured by the action of the bacteria falls within the range pH 5.0 to pH 6.5.

HUGH R. STILES.